Jan. 8, 1963   D. L. KLASS   3,072,444
METHOD AND APPARATUS FOR LUBRICATING BEARING-JOURNAL ASSEMBLIES
Filed Dec. 9, 1960

INVENTOR.
DONALD L. KLASS
BY
ATTORNEY

United States Patent Office 3,072,444
Patented Jan. 8, 1963

3,072,444
METHOD AND APPARATUS FOR LUBRICATING BEARING JOURNAL ASSEMBLIES
Donald L. Klass, Barrington, Ill., assignor to The Pure Oil Company, Chicago, Ill., a corporation of Ohio
Filed Dec. 9, 1960, Ser. No. 74,848
6 Claims. (Cl. 308—1)

This invention is directed to a bearing-journal assembly, principally intended to operate under conditions of hydrodynamic lubrication. More particularly, this invention is directed to a bearing-journal assembly lubricated with an electric-field-responsive fluid, so that the viscosity of the lubricating fluid may be varied by applying electric potential between the bearing and journal.

Electric-field-responsive fluids are known in the art. Such fluids undergo dramatic changes of viscosity under the influence of an imposed electric potential. Thus an electro-fluid, which is a thin liquid in the absence of an electric potential, becomes a very viscous or even semi-solid material under the influence of an intense electric field. The compositions of such fluids and their properties are known in the art, as exemplified by U.S. Patent No. 2,661,825. These fluids themselves form no part of the instant invention. Electric-field-responsive fluids respond in varying degrees to applied D.C. and A.C. potentials. While both A.C.- and D.C.-responsvie fluids may be utilized in the instant invention, alternating-potential-responsive fluids are preferred because in general they are less apt to be adversely affected by the incorporation of additives employed to confer desirable properties upon lubricants.

It is known that when bearing-journal assemblies intended to operate under hydrodynamic conditions of lubrication are subjected to excessive bearing loads, the hydrodynamic lubrication breaks down and boundary or transitional lubrication exists, in which there may be some metal to metal contact between the bearing and journal. It is known that the load-carrying capacity of a hydrodynamically-lubricated bearing varies in direct proportion to the viscosity of the lubricant employed. Thus, if the viscosity of the lubricant is doubled, the applied load may be doubled without adversely affecting lubricating performance.

Unfortunately, high-viscosity lubricants provide unsatisfactory bearing performance under light loads, because of excessive drag and the generation of excessive amounts of heat. Several methods have been proposed in the prior art for providing a lubricant of increased viscosity during periods of heavy-load operation, and to provide a lubricant of lesser viscosity during periods of light-load operation. One such method is to inject air into the bearing housing to increase the viscosity of the lubricant, but this method has very little effect unless extraordinarily high pressures are applied, because for all practical purposes, most fluid lubricants, and especially petroleum-base oils, are incompressible. Another method employed with systems in which lubricant from a reservoir is pumped under pressure to the bearing-journal assembly, and then returned to the reservoir, is to provide a plurality of reservoirs and lubricants, and appropriate valve means, so a lubricant of the desired viscosity can be selected to match the bearing load. Such methods are complex and cumbersome, and a wide range of lubricants must be maintained to provide satisfactory matching of load and viscosity.

It is an object of this invention to provide a method for lubricating bearing-journal assemblies in which the viscosity of the lubricant can be exactly matched to the load-carrying requirements of the bearing. Another object of this invention is to provide a bearing-journal assembly in which the viscosity of the lubricant can be varied through a wide range to match precisely the requirements of the bearing.

Briefly, in the method of this invention a bearing-journal assembly is lubricated with an electric-field-responsive fluid, and means are provided for applying an electric potential between the bearing and journal, such that the potential varies in proportion to the magnitude of the load carried by the bearing-journal assembly.

The invention is best described with reference to the drawings, of which:

Figure 1:
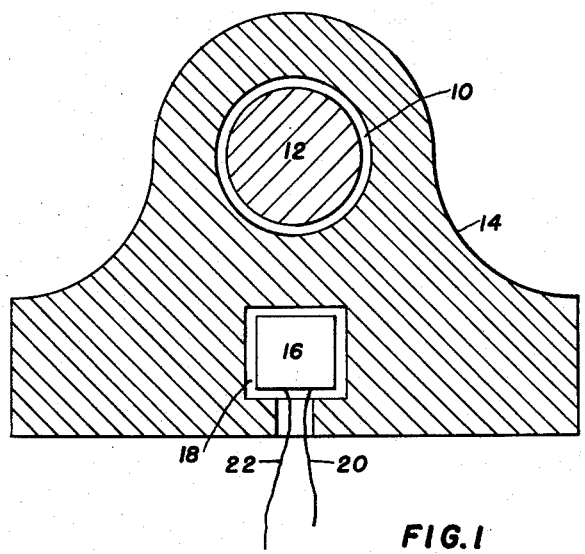
FIGURE 1 is a frontal view, partially in section, of a bearing-journal assembly fabricated in accordance with this invention.
Figure 2:
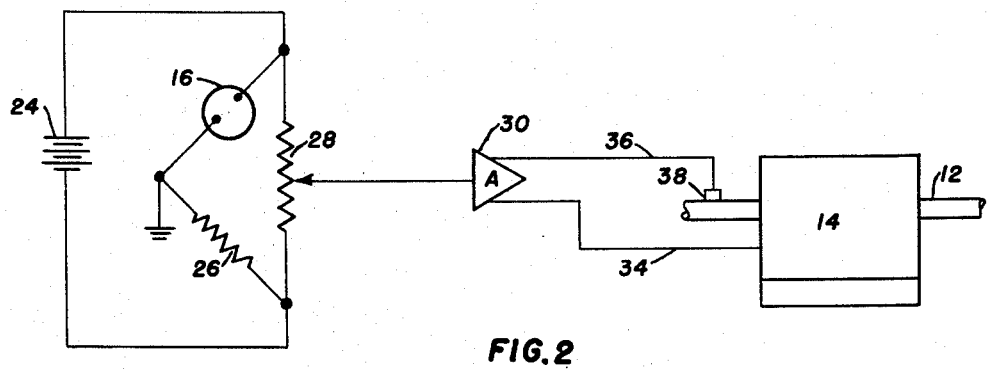
FIGURE 2 is a side view, partially schematic, of the electronic means which may be used as a part of the apparatus of this invention.

Referring to FIGURES 1 and 2, a lubricant film of electric-field-responsive fluid 10 fills the annular space between journal 12 and bearing 14. The fluid film may be sealed in the space between the bearing and journal, or may be pumped from the lubricant reservoir of a pressure lubricating system. An electric strain-gauge 16 is disposed within cavity 18 in bearing 14. Conductors 20 and 22 extend from strain gauge 16 to the exterior of the bearing. It is evident that the deflection of bearing 14 is proportional to the load applied to the bearing, and strain gauge 16 is secured to bearing 14 and therefore is responsive to the deflection of bearing 14 and to the magnitude of the load carried by the bearing. Strain gauge 16 is connected in a Wheatstone-bridge circuit which comprises a power source 24, a resistance 26, and a potentiometer 28. The output of the Wheatstone-bridge circuit is fed via potentiometer 28 to amplifier 30. The output voltage of amplifier 30 is connected through conductor 34 to bearing 14, and through conductor 36 and brush 38 to journal 12.

Potentiometer 28 is adjusted so that the bridge circuit is balanced when the bearing-journal assembly operates under conditions of no load. As load is applied to the bearing, the Wheatstone-bridge circuit responds to the change in resistance of the strain gauge 16, and the output of the bridge circuit is amplified by amplifier 30. The voltage output of the amplifier is fed to the bearing and journal, so that the output voltage is applied across the bearing and journal, and transversely to the electric-field-responsive lubricant film. The viscosity of the lubricant film accordingly varies in proportion to the magnitude of the load carried by the bearing and journal. Alternatively, amplifier 30 may be biased to cut off so that there will be no output from the amplifier until the input signal from the bridge circuit reaches a predetermined value. This predetermined value may be selected such that amplifier 30 will produce an output voltage when the amplified load approximates the maximum load which can be carried by the journal and bearing under conditions of hydrodynamic lubrication. This load is dependent upon the residual viscosity of the electric-field-responsive lubricant employed.

The electronic means specifically described, by way of example, is only one of many alternative means which may be applied to supply an electric potential, the magnitude of which varies in response to the load carried by the bearing. Oil seals, if used, should be fabricated of an electrically insulating material, such as synthetic rubber so that a short circuit will not be produced between the bearing and journal. The electric-field-responsive lubricant may be in the form of an oil or a grease, depending upon the kind of service intended. Where an oil is used, the oil film may be retained by means of oil seals, and additional oil may be fed through conventional oilers. The viscosity of the oil, while in the oiler, will be merely the residual viscosity of the electric-field-responsive oil lubricant. Thus there will be no interference with the conventional operation of the oiler. The same is true of pressure lubrication systems in which the oil is applied to the bearing-journal assembly under pressure, and circulated from an oil reservoir.

The electric-field-responsive fluid may contain extreme-pressure agents and other agents added to lubricants for specific purposes.

An electric-field-responsive lubricant may be compounded as follows:

|  | Percent |
|---|---|
| 85 vis. neutral oil | 35 |
| Silica | 45 |
| Ethylene glycol | 5 |
| 1-hydroxyethyl-2-heptadecanol-imidazoline | 10 |
| N-aminoethyl ethanolamine | 1 |
| Glycerolmonooleate | 4 |

The percentages expressed are by weight.

The embodiments of the invention in which an exclusive property or privilege is claimed are defined as follows:

1. In the lubrication of a bearing-journal assembly, the improvement comprising employing as a lubricant therefor an electric-field-responsive fluid, applying between the bearing and journal an electric potential, and varying said potential in proportion to the load transmitted through said bearing and journal.

2. The method in accordance with claim 1 in which no potential is applied until the lubrication of said assembly approaches boundary lubrication conditions, and then sufficient potential is applied to maintain lubrication under increasing load.

3. In a bearing-journal assembly, the improvement comprising means responsive to the load carried thereby for applying an electric potential between the bearing and journal.

4. An assembly in accordance with claim 3 in which said means comprises a resistance-change strain gauge secured to the bearing to measure deflection thereof under load, and means responsive to the resistance change of said strain gauge for applying electric potential between the bearing and journal.

5. An apparatus in accordance with claim 4 in which said means responsive to the resistance of said strain gauge comprises a Wheatstone-bridge circuit in which said strain gauge is connected as one branch, an amplifier for amplifying the output for said bridge circuit, and means for applying the output of said amplifier across said bearing and journal.

6. An apparatus in accordance with claim 3 including an electric-field-responsive-lubricant disposed between the bearing and journal.

References Cited in the file of this patent

UNITED STATES PATENTS

| 2,596,654 | Clark et al. | May 13, 1952 |
| 2,667,237 | Rabinow | Jan. 26, 1954 |